Figure 1:
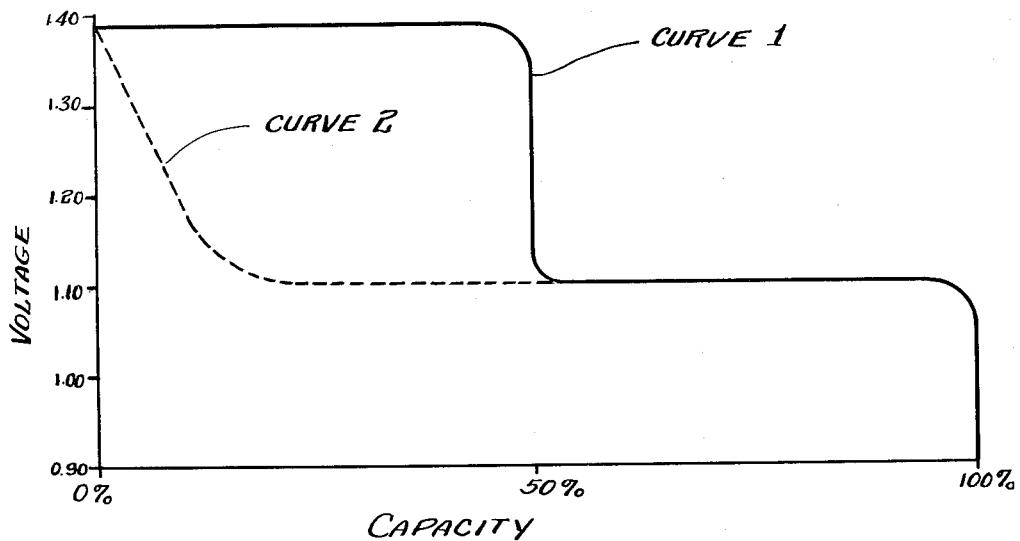

June 28, 1966 G. RAMPEL 3,258,362
METHOD OF PRODUCING A SILVER OXIDE ELECTRODE STRUCTURE
Filed Dec. 18, 1961

INVENTOR.
Guy Rampel
BY
Wallenstein, Spangenberg
& Hattis Attys.

3,258,362
METHOD OF PRODUCING A SILVER OXIDE ELECTRODE STRUCTURE

Guy Rampel, East Brunswick, N.J., assignor to Gulton Industries, Inc., Metuchen, N.J., a corporation of New Jersey
Filed Dec. 18, 1961, Ser. No. 159,835
9 Claims. (Cl. 136—75)

This invention relates to a structure having utility as the positive element in an electrochemical cell. In particular, this invention relates to a structure having utility as the silver oxide electrode in such systems as, for example, silver-zinc and silver-cadmium alkaline cells, and to a method of producing such a structure.

In the typical electrochemical cell wherein a silver oxide electrode is employed as the positive plate, the reaction within the cell at the silver oxide electrode occurs in two reduction steps as follows:

$$2Ag_2O + H_2O + 2e \rightarrow Ag_2O + 2OH^-$$
$$Ag_2O + H_2O + 2e \rightarrow 2Ag + 2OH^-$$

Although silver oxide ($Ag_2O$) and divalent silver oxide (AgO) can be used successfully as the anodic material in such cells, it is manifest from the foregoing equations that, on discharge, a cell employing silver oxide ($Ag_2O$) as the active material will generate only one-half the amount of electricity as an equal amount of the divalent silver oxide (AgO). Therefore, the electrical characteristics of an electrochemical cell utilizing a divalent silver oxide electrode are largely influenced by the quantity of the divalent oxide present in the electrode.

Apart from this important distinction between the two oxides of silver, there exists a significant difference in the potentials thereof which materially affects the performance of electrochemical cells employing such electrodes. The potential of the lower oxide ($Ag_2O$) is approximately 1.12 volts as compared to approximately 1.40 volts for the higher or divalent silver oxide (AgO). To realize the greater potential corresponding to the divalent silver oxide, ideally, all of the silver on the electrode should be convertible to its divalent oxide state. However, in silver oxide electrodes prepared in accordance with conventional practices, only about 50% to 60% of the available silver is convertible to the higher oxide, and only 5 to 10% of this amount is active in producing the greater voltage.

Heretofore, silver oxide electrodes have been prepared in a variety of ways, one illustrative procedure generally comprising applying a heavy coating of paste of silver oxide ($Ag_2O$) to a silver screen or platinum gauze, followed by heating at a temperature ranging from 400° C. to 700° C. to decompose the oxide and produce a plate of sintered silver particles. This plate is then made the anode in an electrolytic cell containing as the electrolyte an aqueous solution of potassium hydroxide. A low current density is maintained in the cell for approximately 15 to 20 hours, after which time oxygen is evolved indicating that the plate is fully charged.

An alternative, but less commonly used, method of preparing conventional silver oxide electrodes involves electrolytically depositing on a suitable cathodic base material free silver from a silver salt solution. The silver plated material is then heated at a temperature ranging from 400° to 700° C. to form a plate of sintered silver particles. This plate is oxidized anodically to silver oxide. As in the case of preparing silver oxide electrodes utilizing a paste of silver oxide ($Ag_2O$), this process requires substantial amounts of time to complete.

From the economic standpoint, conventionally prepared silver oxide electrodes are more costly not only due to the time factors involved in their production, but also to the fact that comparatively large flattened surface areas are coated with the expensive silver to insure that a cell equipped with such an electrode will have adequate capacity over a reasonable lifetime of the cell.

Apart from these important economic disadvantages, there exist certain mechanical and functional shortcomings in conventionally produced silver oxide electrodes which place significant limitations on the shelf life and utility of cells in which they are utilized. Of importance in this regard is the relatively fragile character of standard silver oxide electrodes, a condition largely due to the inherent weakness of supporting structures used and to the silver which serves as the supporting surface for the layer of oxide on the electrode. Further, in this same connection, the relatively thick layer of oxide on the external surfaces of conventional electrodes tends to flake or peel off, and it is not unusual for this activity to cause short circuiting internally of the cell in which the electrodes are employed.

It has previously been pointed out hereinabove that only about 50% to 60% of the available silver in conventionally prepared silver oxide electrodes is convertible to the desired divalent silver oxide, and that only a small fraction of this amount is active in producing the higher voltage corresponding thereto. This relatively low coefficient of utilization of the silver is attributable, in large measure, to phenomena arising out of the sintering operation employed in standard silver oxide electrode preparation methods. The comparatively higher temperatures required in this operation to sinter the silver tend to cause a substantial proportion of the particles thereof to coalesce and form a homogeneous, solid solution. Subsequently, upon anodization of the electrode structure, only a thin area of the surface of the sintered particles is converted to the desired oxide, leaving an interface of metallic silver between the oxide and the supporting base material.

The interface of meallic silver thus formed reacts with the surface confined divalent oxide (AgO) to reduce it to the lower oxide ($Ag_2O$), and this reaction takes place in a cell utilizing the electrode whether the cell is idle or in use. As previously indicated this phenomenon prevents the higher potential corresponding to the divalent silver oxide from being realized for any significant portion of the cycle. This effect is particularly undesirable in those situations where close voltage control is required at relatively high current densities.

It is an object of this invention to provide a silver oxide electrode structure having marked utility as the positive element in an electrochemical cell which enables utilization of upwards of 95% of the available silver in the structure.

It is also an object of this invention to provide a silver oxide electrode structure having the active divalent silver oxide in intimate contact with a supporting base material substantially inert with respect to the oxide.

It is still another object of this invention to provide an improved silver oxide electrode structure which, when used as the positive element of an electrochemical cell, will have the active silver oxide material substantially uniformly distributed therethrough, thus permitting essentially constant current densities to be obtained during the charge and discharge cycles of the cell.

It is another object of this invention to provide a silver oxide electrode structure which permits an improved cell employing the structure as the positive element to perform at a high working or open circuit voltage for a substantial portion of the discharge cycle of the cell at relatively high discharge rates.

It is yet another object of this invention to provide an improved silver oxide electrode structure the surface of which is substantially free of metallic silver, thereby materially reducing the possibility of internal short circuiting of a cell utilizing the structure due to flaking or shedding of active silver oxide material.

It is another object of this invention to provide a new and improved silver oxide electrode structure which is light in weight and yet mechanically stronger than conventional silver oxide electrodes.

It is also an object of this invention to provide a method of preparing silver oxide electrode structures which employs materials, conditions and techniques adaptable to a continuous operation, and which enables the preparation of silver oxide electrode structures having the superior and unexpected properties herein set forth.

Other objects and advantages will appear from the more detailed description to follow.

I have discovered that the objects of this invention can be achieved by a series of steps which include initially impregnating a porous unit mass or structure of sintered or interconnected particles with a solution of low surface tension having dissolved therein a suitable silver compound. The porous mass or structure especially desirably produced of a metallic or non-metallic material which is substantially inert in its activity with respect to the oxides of silver. It will, of course, be understood that the mass or structure can be prepared in any manner known in the art and in such required shapes and dimensions as may be desired, and the terms "mass" and "structure" are, therefore, used herein in a generic sense to cover the product in whatever physical shape or form it may be prepared.

In the particularly preferred aspects of this invention, a sintered nickel matrix is most advantageously employed as the supporting material for the silver oxide electrode structure. This porous matrix may be of the type utilized in the construction of standard nickel-cadmium alkaline cells and may be prepared by sintering nickel powder obtained from nickel carbonyl. The porous structure produced in this manner may vary considerably in dimensions and other characteristics such as porosity and pore volume. The objects of this invention are especially desirably achieved with a matrix weighing from 4 to 8 grams and having a porosity of from 65 to 85% with a total pore volume of from 1.0 ml. to 4.0 ml.

The surfaces of the particles of the porous structures having utility for the purposes of this invention may be advantageously coated with a relatively thin, intimately bonded layer of silver by applying a vacuum to the unit porous mass or structure and exposing it to a solution containing a silver compound thereby to draw the solution into intimate contact with the surfaces of the particles of the structure. An effective, and especially desirable, alternative procedure for accomplishing this result involves contacting, as by dipping, the structure into a solution having a low surface tension containing the dissolved silver compound. In this manner intimate contact between the surfaces of the particles of the structure and the solution is achieved without the necessity for a vacuum. This procedure has the added advantage of being more adaptable to a continuous operation for producing the structures of this invention.

Following impregnation, excess solution is allowed to drain off and the porous structure is then heated. Heating serves the dual function of thermal decomposition of the silver compound to metallic silver which is retained on the particles of the porous structure, and volatilization of undesired materials including the residue from the decomposition reaction. The steps of impregnating the porous structure followed by heating may be desirably repeated to achieve adequate deposition of silver on the particles. In the event that this practice is followed, the temperatures employed in all but the ultimate heating step may be substantially reduced and need only be in a range sufficient to remove readily volatilizable materials from the structure.

I have discovered that the objects of this invention can be most advantageously achieved when temperatures below 400° C. are employed in the heating step of my method. Excellent results may be obtained at a temperature in the range of about 100° C. and better still 150° C. to 300° C. with optimum effects being realized at a temperature of from 150° C. to 200° C. Temperatures in excess of 400° C., ranging to 700° C., may be employed, but tend to cause the particles of silver deposited on the surfaces of the porous structure to coalesce and form a solid solution. This has the undesirable effect of rendering a portion of the silver unavailable for conversion to the desired divalent silver oxide thereby deleteriously affecting the electrical characteristics of the electrode structure.

An effective alternative procedure to thermal decomposition of the silver compound deposited within the porous structure during the impregnation step of my process involves chemically reducing the compound to metallic silver by introducing an agent into the structure which brings about the desired reaction but does not adversely affect the interconnected particles of the porous structure. The residue from the reaction is then removed by heating to volatilize it, or by washing.

In determining whether the desired amount of silver has been deposited within the porous structure, the increase in weight of the structure resulting from the up-take of silver provides the most convenient standard for monitoring the operation. Generally, this determination will elicit a final weight increase in the structure of at least 15%, and, most generally, from 20% to 100%, or more, over its original weight. An alternative, but less convenient, procedure for ascertaining the degree and adequacy of silver deposition within the structure is to determine the extent to which the porosity of the structure has diminished. Most desirably this determination represents a decrease in porosity within the structure of at least 10%, and usually from 25% to 75%, or more, of its initial porosity.

The silver compounds most advantageously employed in producing the silver oxide electrode structures of this invention are desirably those that can be solubilized preferably in accordance with standard practices and which are susceptible to thermal or chemical decomposition under the conditions hereinabove called for. Examples of compounds permitting the fulfillment of the objects of this invention are silver acetate, silver carbonate, silver chlorate, silver citrate, silver lactate, silver nitrate, silver oxide, silver phosphate, silver sulfate, silver nitrite, silver sulfide, silver oxalate, silver cyanide, silver fluoride, silver bromate, silver cyanate, and the like.

A variety of silver compound solubilizing agents may be employed in preparing my silver oxide electrode structures. By way of example, and not limitation, such agents include water, ammonium hydroxide, ammonium carbonate, ammonium sulfate, potassium cyanide, sodium thiosulfate, and the like. Particularly effective results are achieved when such solvents are combined with an organic solvent such as, for example, lower alcohols, exemplified by methyl alcohol, ethyl alcohol, propyl alcohol, isopropyl alcohol, and butanol; ketones such as acetone, and dioxane; ethers such as isopropyl ether; glycols and glycol ethers and esters such as diethylene glycol, methyl Cellosolve, ethylene dipropionate, benzyl Cellosolve; and the like. These organic solvents contribute surface tension lowering properties to the solutions which considerably enhances contact with the surfaces of the particles of the porous structure.

The quantity of silver compound dissolved in the impregnating solutions may vary over a wide range. By way of example, solutions containing a quantity of the silver compound approximately equal to one-tenth of the molecular weight of the compound are satisfactory. Most generally the solutions comprise from about 0.5 to 1.0 gram of the silver compound per milliliter of solution. The objects of this invention may be effectively achieved by dissolving the silver compound in a solution comprising, by weight, based on the total weight of the solution, from about 5% to 25% of an organic solvent and from 95% to 75% of water.

I have found that distribution and deposition of the compound within the porous structure is substantially facilitated by incorporating in my solutions a minor proportion, in the order of 1 to 2% by weight, of a suitable anionic, cationic, or non-ionic surface active agent. Such agents serve to further lower the surface tension lowering properties of the impregnating solutions, permitting better and more intimate contact of the materials in the solutions with the particle surfaces of the porous structure. There are numerous agents having utility for this purpose, examples of which are compounds selected from the group consisting of sorbitan higher fatty acid esters and the polyoxyethylene derivatives thereof, such as are sold under the trademarks "Span" and "Tween," specific examples of which are sorbitan monolaurate and polyxyethylene sorbitan monostearate; alkyl phenol polyethylene glycol ethers such as are sold under the trademark "Tergitol," exemplified by hexadecyl phenol polyethylene glycol ether; alkyl aryl ethers, esters and alcohols such as are sold under the trademark "Triton," exemplified by alkyl benzyl ether, the sodium salts of alkyl aryl polyether sulfates, and alkyl benzyl polyether alcohol; alkyl aryl sulfonates such as are sold under trademarks "Udet" and "Ultrawet," exemplified by sodium alkyl aryl sulfonates and alkyl benzene sodium sulfonates; N-higher alkyl quaternary ammonium salts such as are sold under the trademarks "Sapamine" and "Arquad," specific examples of which are n-dodecyl trimethyl ammonium chloride and di-n-octadecyl dimethyl ammonium chloride; ethylene oxide condensation products of the primary fatty amines such as are sold under the trademark "Ethomeen," exemplified by polyoxyethylene higher alkyl tertiary amines; and the like.

Following impregnation and deposition of the silver in the porous structure, the external surfaces of the structure are advantageously processed to remove substantially all of the silver therefrom. This may especially desirably be accomplished by simply rubbing or buffing the exterior of the structure with a suitable fine abrasive material. Removal of the silver from the exterior of the structure prior to charging substantially eliminates the formation of oxide thereon during charging. In this manner shedding or flaking of the oxide from the structure is, for all practical purposes, overcome, and the possibilities of internal short circuiting of an electrochemical cell resulting from this phenomenon are materially reduced. This, obviously, has a direct effect on the shelf life of the charged cell.

The following are illustrative specific examples of the manner of carrying out my invention.

EXAMPLE I

A plaque of sintered nickel was dipped into a solution comprising 16.7 grams of silver acetate, 12.5 ml. of methyl alcohol and 12.5 grams of a 28% solution of ammonium hydroxide. The plaque was removed and the excess solution was allowed to drain off. The plaque was then dried at a temperature of 175° C. The dipping, draining and drying operations were repeated until the desired amount of silver had been deposited within the plaque. The results were as follows:

*Initial specifications of plaque*

(1) Weight _____ 6.4 grams.
(2) Porosity _____ 72%.
(3) Total pore volume _____ 2.4 ml.

*Specification of plaque after impregnation*

(1) Weight _____ 11.9 grams.
(2) Porosity _____ 47%.
(3) Silver pick-up _____ 2.3 grams/ml. of pore volume.

The impregnated plaque was abraded to remove silver deposited on the external surfaces thereof and was then oxidized anodically until the divalent silver oxide was formed. An alkaline cell, employing the silver electrode as the positive plate, a conventional cadmium electrode as the negative plate, and a 35% solution of potassium hydroxide as the electrolyte, was then constructed. The normal discharge rate of this cell was compared with a similar cell employing a conventional silver oxide electrode. The discharge curves for each cell are illustrated in FIG. 1 of the accompanying drawing. The Curve 1 represents the discharge curve of the cell utilizing the silver oxide electrode structure of this invention, while the Curve 2 denotes the discharge curve of the cell using a conventional silver oxide electrode. It is observed from this comparison that a cell constructed with the silver oxide electrode structure of this invention can be discharged at the higher voltage for approximately 50% of the capacity of the cell, a performance feature heretofore unattainable with conventionally produced silver oxide electrodes.

EXAMPLE II

Chemical deposition of silver in a matrix of sintered nickel was accomplished by dipping the matrix into a solution comprising 16.9 grams of silver nitrate, 8.2 grams of sodium acetate, 6.5 grams of monoethanolamine, 20 grams of glyoxal, and 5.0 ml. of methyl alcohol. The matrix was dried and then rinsed. The dipping, drying and rinsing steps were repeated. The results were as follows:

*Initial specifications of matrix*

(1) Weight _____ 7.9 grams.
(2) Porosity _____ 72%.
(3) Total pore volume _____ 2.4 ml.

*Specifications of matrix after impregnation*

(1) Weight _____ 11.5 grams.
(2) Porosity _____ 30%.
(3) Silver pick-up _____ 1.5 grams/ml. of pore volume.

The silver compound formed in the solution is unstable and decomposes at room temperature to deposit metallic silver on the interconnected particles comprising the matrix. Instead of using sodium acetate, ammonium acetate, ammonium hydroxide, or sodium hydroxide can be substituted. Compounds other than glyoxal that may be used to achieve chemical deposition of silver in the matrix are aldehydes such as formaldehyde and acetaldehyde; amines such as hydrazine and methylhydrazine; and mono- and dibasic acids such as formic acid and tartaric acid, and the salts thereof.

The outstanding performance of cells employing my silver oxide electrode structure is attributable, in part, to the high coefficient of utilization of the silver component of the electrode. This value approaches 95% with my electrode structure as compared to approximately 50% to 60% for standard silver oxide electrodes, and is made possible, among other factors, by the intimate contact of fine grained silver distributed on the surfaces of the inert interconnected particles of the porous structure.

Apart from the unique properties of the electrode structure of this invention hereinabove discussed, electrochemical cells employing my silver oxide electrode can be charged at rates higher than those used for cells containing conventional silver oxide electrodes without excessive gassing during the charging cycle because of the higher charging efficiency of my electrode. In addition, cells containing the silver oxide electrode structure of this invention have a substantially longer shelf life than cells utilizing standard silver oxide electrodes for reasons over and above those already pointed out. This is made possible in large measure by the high stability of the divalent silver oxide in the structure of this invention. Since there is substantially no interface of unoxidizable silver present between the divalent silver oxide and the supporting base material, and since the base material is substantially inert with respect to the oxide, the divalent silver oxide is not reduced to the lower, soluble silver oxide. In cells utilizing conventional silver oxide electrodes, the lower oxide of silver is formed due to the presence of an interface comprising unconverted silver. This oxide of silver is dissolved by the electrolyte of the cell resulting in deposition of the oxide on the separators used in the cell. This, as in the case of shedding or flaking, causes internal shorting of the cell.

As pointed out previously, the method of producing my electrode may be conveniently adapted to a continuous operation. No specialized equipment is necessary. The method offers an efficient, economical and effective procedure for obtaining silver oxide electrode structures having properties heretofore unrealized with conventional methods.

The foregoing detailed description has been given for purposes of explanation only and no unnecessary limitation should be understood therefrom, it being understood that numerous changes may be made in the manner of carrying out the invention, all within the spirit of the guiding principles and teachings provided herein.

What I claim as new and desire to protect by Letters Patent of the United States is:

1. A method of producing a silver oxide electrode for use as the positive element in an electrochemical cell comprising providing an electrically conductive porous structure including a porous matrix of interconnected electrically conductive metallic particles, said particles being substantially chemically inert with respect to metallic silver and the oxides of silver, impregnating said porous structure with a solution consisting essentially of silver ions and an organic surface tension lowering agent, said solution having a surface tension lower than that of water per se, depositing metallic silver on the surfaces of said metallic particles by removing volatile portions of said solution from said porous matrix, and then converting the thus deposited metallic silver to its electrochemically active electrode state.

2. A method as claimed in claim 1 wherein impregnation of the porous structure with the silver ion containing solution is attained by dipping the porous structure in the solution.

3. A method of producing a silver oxide electrode for use as the positive element in an electrochemical cell comprising providing an electrically conductive porous nickel structure including a porous matrix of interconnected electrically conductive nickel particles, impregnating said porous nickel structure with a solution consisting essentially of silver ions and an organic surface tension lowering agent, said solution having a surface tension lower than that of water per se, heating the thus impregnated structure at a temperature below about 400° C. to deposit metallic silver on the surfaces of said nickel particles and to remove impregnated volatiles from said porous matrix, repeating, if necessary, the impregnating and heating steps until the weight of the porous structure is at least 15% greater than its original weight, the said difference in weight representing the metallic silver deposited on the surfaces of said nickel particles, and then converting the thus deposited metallic silver to its electrochemically active electrode state.

4. A method as claimed in claim 3 wherein the impregnated structure is heated at a temperature of from about 150° C. to about 300° C. to deposit metallic silver on the surfaces of said nickel particles and to remove impregnated volatiles from said porous matrix.

5. A method as claimed in claim 4 wherein the porous nickel structure is impregnated with a solution consisting essentially of an aqueous ammoniacal methyl alcohol solution of silver acetate.

6. A method as claimed in claim 5 wherein the silver acetate is present in the solution in a concentration of from about 0.5 to about 1 gram per each milliliter of solution.

7. A method as claimed in claim 3 wherein a surface active agent is added to said solution to enhance the surface tension lowering properties of said solution.

8. A method of producing a silver oxide electrode for use as the positive element in an electrochemical cell comprising providing an electrically conductive porous nickel structure including a porous matrix of interconnected electrically conductive nickel particles, said porous matrix having a porosity of from about 65% to about 85%, providing an organic solvent solution consisting essentially of silver ions and having a surface tension lower than that of water per se, impregnating said porous structure with said solution, depositing substantially pure metallic silver on the surfaces of said particles by removing impregnated electrochemically inactive materials from said matrix, repeating, if necessary, the impregnating and deposition steps until sufficient metallic silver has been deposited on the surfaces of said particles to lower the porosity of said porous matrix by from about 10% to about 75% of its original porosity, and then converting the thus deposited metallic silver to its electrochemically active electrode state.

9. A silver oxide electrode produced in accordance with the method of claim 1.

References Cited by the Examiner

UNITED STATES PATENTS

| | | | |
|---|---|---|---|
| 2,358,326 | 9/1944 | Hensel et al. | 29—182.1 X |
| 2,681,375 | 6/1954 | Vogt | 136—20 |
| 2,849,519 | 8/1958 | Freas et al. | 136—20 |
| 2,850,555 | 9/1958 | Pucher et al. | 136—20 |
| 2,934,460 | 4/1960 | Ramadanoff | 117—130 X |
| 3,024,296 | 3/1962 | Adler | 136—24 |
| 3,055,964 | 9/1962 | Solomon et al. | 136—76 |

WINSTON A. DOUGLAS, *Primary Examiner.*

JOHN H. MACK, MURRAY TILLMAN, *Examiners.*

J. BARNEY, B. J. OHLENDORF, *Assistant Examiners.*